United States Patent
Cantolino

(10) Patent No.: US 8,151,621 B1
(45) Date of Patent: Apr. 10, 2012

(54) FINGER TOUCH TESTING DEVICE FOR DRAIN PAN SENSOR

(76) Inventor: Christopher Ralph Cantolino, Bradenton, FL (US)

(*) Notice: Subject to any disclaimer, the term of this patent is extended or adjusted under 35 U.S.C. 154(b) by 565 days.

(21) Appl. No.: 12/422,025

(22) Filed: Apr. 10, 2009

(51) Int. Cl.
*G01F 19/00* (2006.01)

(52) U.S. Cl. .......................................... 73/1.73
(58) Field of Classification Search .................... 73/1.73
See application file for complete search history.

(56) References Cited

U.S. PATENT DOCUMENTS

| | | | | |
|---|---|---|---|---|
| 5,188,143 A | * | 2/1993 | Krebs | 137/312 |
| 2003/0201898 A1 | * | 10/2003 | Stuchlik, III | 340/608 |
| 2008/0001707 A1 | * | 1/2008 | Urben et al. | 340/5.62 |

* cited by examiner

*Primary Examiner* — Hezron E Williams
*Assistant Examiner* — Nathaniel Kolb
(74) *Attorney, Agent, or Firm* — Dorothy S. Morse

(57) ABSTRACT

A device attached to a fluid-level sensing probe used in association with the primary drain pan located inside an air conditioning unit or other condensate-producing unit, which provides quick testing for proper sensing probe function without its removal from the condensate-producing unit. A tester can simply press a different finger against each of two electrically-conductive rods attached to an inverted U-shaped mount that is typically fixed to the upper perimeter edge of a secondary drain pan positioned underneath at least a portion of the condensate-producing unit. If the sensing probe is properly functioning, the tester will immediately know, as a circuit will be completed and the condensate-producing unit will be shut off and/or a pump activated to assist removal of collected condensate from the secondary drain pan. For user convenience, an optional quick disconnect can be provided between the sensing probe and the inverted U-shaped mount.

11 Claims, 8 Drawing Sheets

FINGER TOUCH TESTING DEVICE FOR DRAIN PAN SENSOR

CROSS-REFERENCES TO RELATED APPLICATIONS

None

BACKGROUND

1. Field of the Invention

The present invention generally relates to water detection systems associated with air conditioning systems, and more particularly relates to a device providing rapid means for testing the proper operation of the sensing probe of a fluid-level monitoring switch system associated with the primary drain pan located inside an air conditioning unit or other condensate-producing unit, without removal of the sensing probe from the condensate-producing unit being needed to conduct the testing. Instead, installers and maintenance personnel can simply press a different finger against each of two electrically-conductive rods attached to a mount with an inverted U-shaped configuration can be easily fixed to the upper perimeter edge of a secondary drain pan positioned underneath at least a portion of the condensate-producing unit, wherein if proper functioning of the sensing probe occurs, a circuit will be completed that initiates the action otherwise expected as a result of proper sensing probe function, such as but not limited to the shutting off of the condensate-producing unit or activation of a pump to remove collected condensate from the secondary drain pan. No moving parts are required for present invention testing, and no switch must be manually engaged by the tester. Due to the limited amount of space available in many drain pan installations, a fastener securing the inverted U-shaped mount in place against a secondary drain pan is connected to the inverted U-shaped mount so as to engage an inside surface of the pan wall. Furthermore, an optional quick disconnect between the sensing probe and the inverted U-shaped mount can provide additional convenience during installation and maintenance activity related to the condensate-producing unit and its fluid-level monitoring system/assembly.

2. Description of the Related Art

Although no such system or assembly is shown in the accompanying illustrations, the present invention is commonly used with assemblies that monitor the air handling system in a building structure to provide for safe and proper system operation. An air handler, such as a forced air furnace, ventilator, or cooler, receives air from an intake and pushes the air out through a duct. During the air handling process, the temperature of the air is altered as it passes through the air handler. Such activity produces condensation, particularly when the air is cooled by an air conditioning system associated with the air handler. Under the influence of gravity, condensation is typically collected by a primary drain pan located within the air handler, with a secondary drain pan also optionally present to collect additional fluid under the air handler and reduce the opportunity for fluid damage to the unit itself and/or its surroundings. However, the condensation produced in a twenty-four hour period can be more than the secondary drain pan can hold. This is a particularly common occurrence with some air conditioning systems. Therefore, the drain pans thereof are often mounted in a non-level orientation and connected to a drain pipe or hose that carries the collected condensate to a suitable location outside the structure. However, in some fluid collection applications the removal of condensate from a secondary drain pan requires periodic pumping, and provisions are needed should a blockage or other malfunction occur. Thus, when a secondary drain pan is used, a fluid level sensing unit is typically placed in association with it. Thereafter, when the depth of collected condensate reaches a predetermined threshold level, the fluid level sensing unit generates a signal and sends it to a fluid-sensing switch system circuit to activate the pump. When sufficient water is removed from the drain pan for the water sensor to stop sending the activation signal, the fluid-sensing switch system circuit deactivates the pump. In this manner, the pump is only activated when necessary to pump water out of the drain pan, thereby prolonging the life of the pump, while preventing water from overflowing the vertically-extending walls of the drain pan. Fluid level sensing units associated with secondary drain pans are readily accessible and relatively easy to test for proper operation.

However, an important disadvantage of many secondary drain pan fluid-level sensors in current use is that they contain an upwardly-deployable float body which can be unreliable and not function properly when needed, or in the alternative produce false signaling that could cause pump activation when insufficient water is present and damage to an associated pump. As a result, many local codes are now requiring the use of fluid-level monitoring systems directly associated with the primary drain pan inside an air conditioning unit or other condensate-producing unit. However, since the fluid-level sensing probe is physically located inside a condensate-producing unit, after its installation it is time consuming to test it for continuing proper function. Through use of the present invention, testing the proper operation of a sensing probe that monitors fluid levels in a primary drain pan inside a condensate-producing unit is easy. Instead of having to remove the sensing probe from its established position of use, with the present invention one simply can press a different finger against each of two easily-accessed electrically-conductive rods attached to its inverted U-shaped mount, which is also typically fixed to the upper perimeter edge of a secondary drain pan positioned underneath at least a portion of the condensate-producing unit and in a location readily accessible to a tester. If proper function of the sensing probe occurs a circuit will be completed and the person conducting the test will immediately know, as the condensate-producing unit will be shut off and/or a pump will be activated to assist in the removal of collected condensate from the secondary drain pan. No moving parts are required for present invention testing, and no switch must be manually engaged by the tester.

BRIEF SUMMARY OF THE INVENTION

It is the primary object of this invention to provide a device that can rapidly test the proper operation of the sensing probe of a fluid-level monitoring switch system associated with the primary drain pan located inside an air conditioning unit or other condensate-producing unit, without removal of the sensing probe from its established position within the condensate-producing unit. It is also an object of this invention to provide a device for fluid-level sensing probe testing that is durably constructed and can be secured to a secondary drain pan via a fastener used from a position inside the pan. In addition, it is an object of this invention to provide a device for fluid-level sensing probe testing that is cost effective to manufacture and requires no assembly at its installation site. It is a further object of this invention to provide a device for fluid-level sensing probe testing that is convenient to install and use, and does not require added time during its installation to establish accurate positioning and/or orientation. It is also an object of this invention to provide a device for fluid-level sensing probe testing that can be used for rapid, reliable, and repeated testing of a sensing probe during long periods of use.

The present invention, when properly made and used, provides a means for rapid testing of a fluid-level sensing probe for proper function while it remains situated in its established position of use needed to monitor the fluid level of the primary drain pan inside an air conditioning unit or other condensate-producing unit. The present invention comprises an inverted U-shaped mount that is intended for positioning over the top edge of a secondary drain pan (which are commonly placed under condensate-producing units to reduce the risk damage to them as well as their surroundings). If a secondary drain pan is not used with a condensate-producing unit, the present invention inverted U-shaped mount could be secured via double-sided tape in a location that permits easy access and quick testing. The inverted U-shaped mount has at least two lateral indentations (also can be referred to as notches or open-sided cutout areas) positioned on opposing sides of the inverted U-shaped mount that are sufficiently large to allow secure gripping of the inverted U-shaped mount by the opposed finger and thumb of a person needing to test the proper function of a fluid-level sensing probe electrically connected to the rods. Opposed lateral indentations are needed on the front portion of the inverted U-shaped mount to protect the electrically-conductive rods from inadvertent contact with electrically-conductive materials, but opposed lateral indentations may also be present in the rear portion of the mount in positions aligned with the most adjacent front lateral indentation. In addition, the present invention comprises electrically-conductive wiring in electrical communication with two electrically-conductive rods, each secured in fixed positions to the inverted U-shaped mount, with a portion of a different rod extending into a each of the opposed lateral indentations. For cost effective manufacture and durable long-lasting use, over-molding is contemplated as the preferred means for securing the electrically-conductive wiring and the two electrically-conductive rods to the inverted U-shaped mount. It is the electrically-conductive wiring that electrically connected the present invention testing rods to a fluid-level sensing probe in need of operational testing. As the fingers of a person needing to test the proper function of an associated fluid-level sensing probe (while it remains undisturbed inside a condensate-producing unit) enter each lateral indentation and touch the electrically-conductive rod therein, a circuit is completed that will initiate the activity otherwise expected as a result of proper sensing probe function, such as but not limited to stopping the operation of the condensate-producing unit and/or activating a pump to start removal of condensate collected in an associated secondary drain pan under the condensate-producing unit. Thus, a tester is made promptly made aware of proper sensing probe operation. No moving parts are required for present invention testing, and no switch must be manually engaged by the tester. In addition, there is no potential opportunity for future sensing probe failure as a result of post-testing re-installation, since the sensing probe remained in its established position of during its testing. Furthermore, due to the limited space available for many secondary drain pan installations, it is contemplated for the most preferred embodiment of the present invention to have a threaded fastener hole through the front portion of its inverted U-shaped mount, so that a hand-tightened fastener can be secured through the front portion for engagement with a portion of the secondary drain pan's inside wall. Also, since the preferred installation of the inverted U-shaped mount is directly over the top of a secondary drain pan wall, and no assembly is required at its installation site, the present invention testing device is convenient to install and does not require added installation time to establish accurate positioning and/or orientation. Additionally, a waterproof quick-disconnect connection can be used between the present invention's electrically conductive wire and an associated fluid level sensing probe. The inverted U-shaped mount of the present invention is preferably constructed from durable plastic materials temperature rated for use in hot attics and the two electrically-conductive rods are preferably made from stainless steel for durability and long term use. Due to all of features and advantages mentioned above, the present invention is able to provide rapid, reliable, and repeated testing of a fluid-level sensing probe during the extended periods anticipated for its use.

The description herein provides preferred embodiments of the present invention but should not be construed as limiting its scope, as other desirable features and characteristics of the present invention will become apparent from the following invention description and its appended claims, as well as the accompanying drawings. For example, variations may occur in the relative lengths of the front and rear portions of the inverted U-shaped mount as long as they are at least the same length; the size, number, and positioning of threaded fastener openings used in the front portion of its inverted U-shaped mount; the thickness dimension and/or perimeter configuration of its inverted U-shaped mount; the size, perimeter configuration, and positioning of the two lateral indentations; the size and configuration of the two electrically-conductive rods; the positioning of each electrically-conductive rod within one of the opposed lateral indentations, and whether the rear portion of the inverted U-shaped mount has opposed lateral indentations. Thus, many variations other than those shown and described herein, may be incorporated into the present invention, and the scope of the present invention should be determined by the appended claims and their legal equivalents, rather than being limited to the examples given.

DETAILED DESCRIPTION OF THE INVENTION

Figure 4:
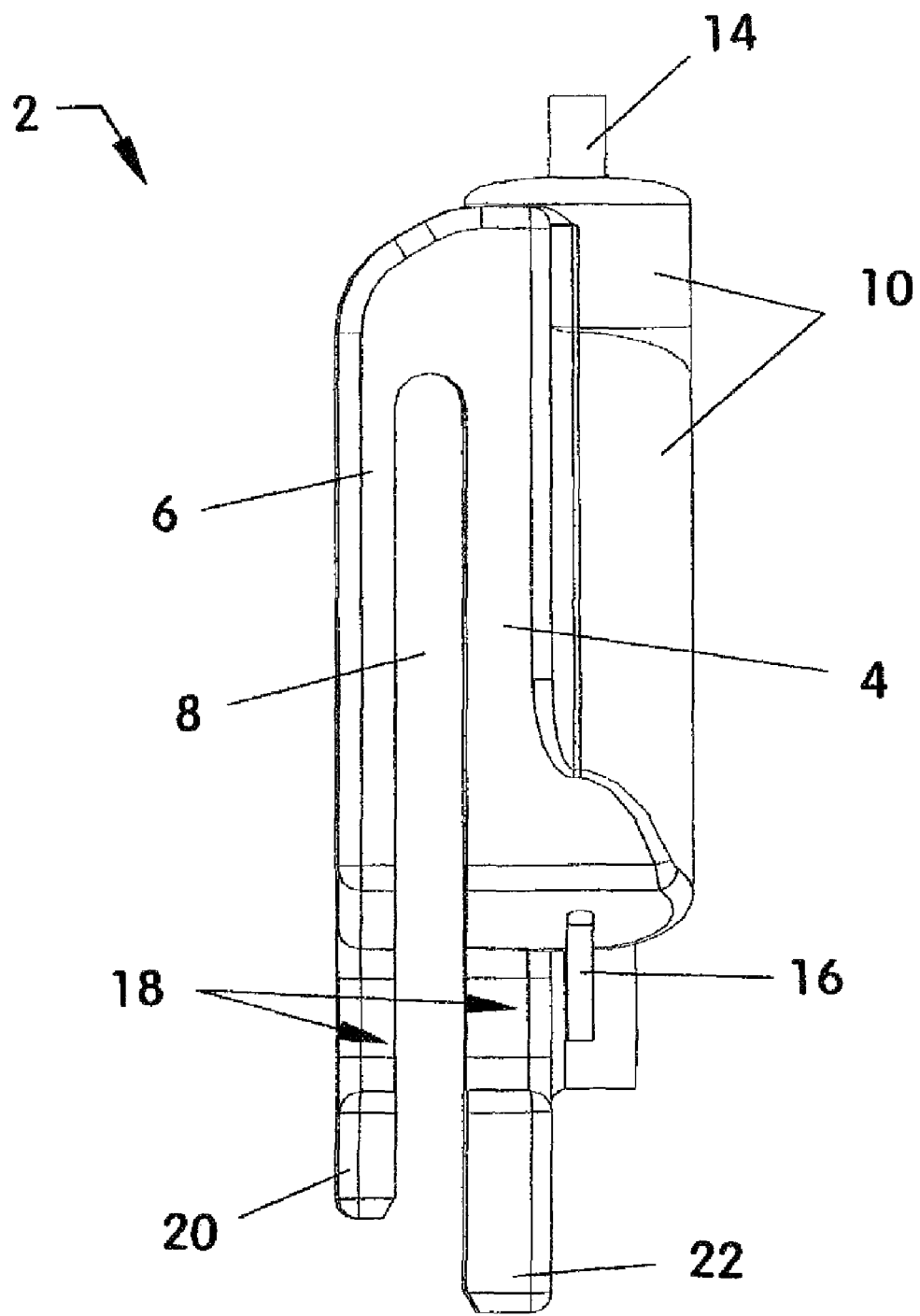
FIG. 4 is a side view of the first preferred embodiment 2 of the present invention providing a clear view through the upwardly-directed slot.
Figure 5:
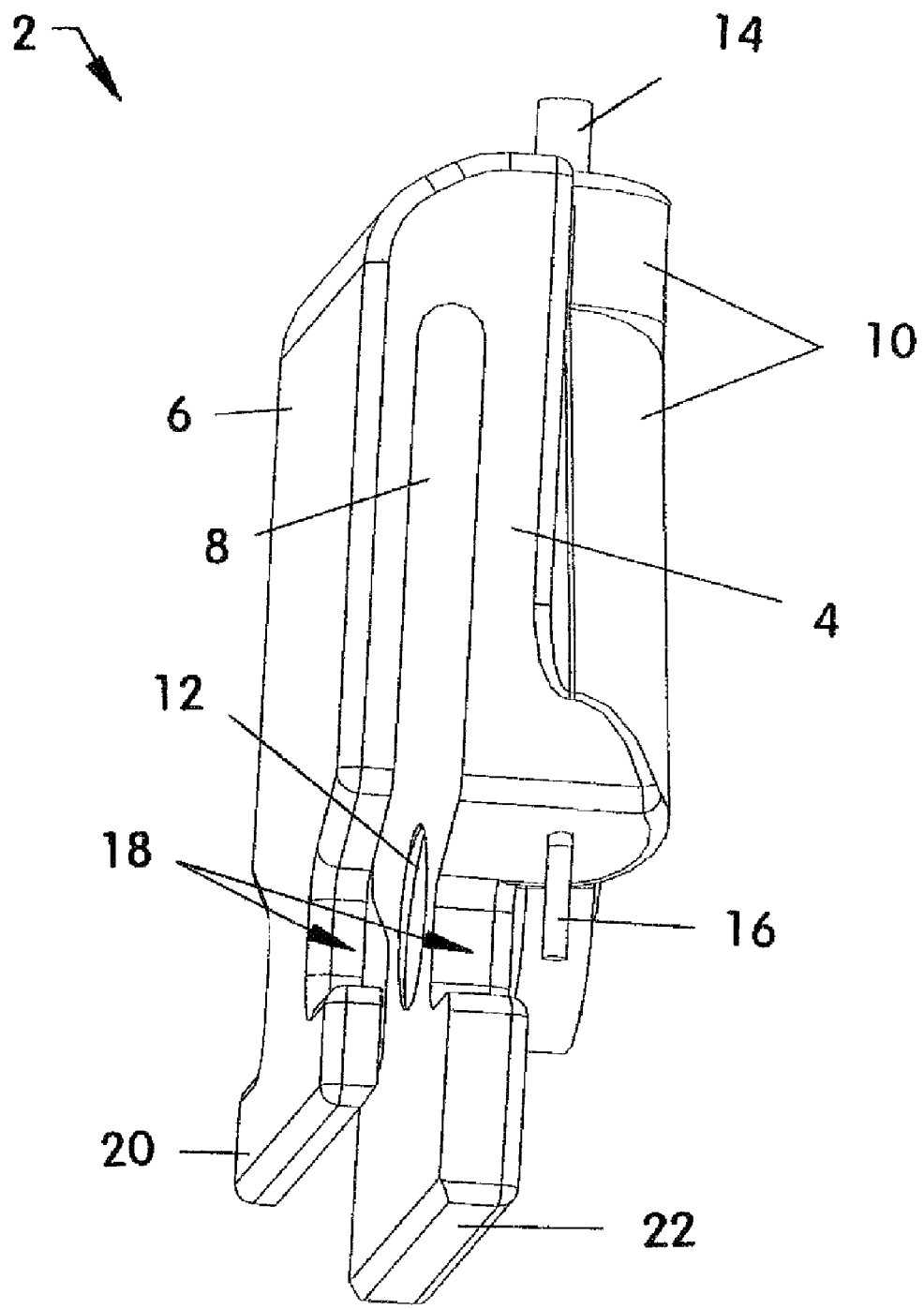
FIG. 5 is a perspective view of the first preferred embodiment 2 of the present invention providing a better view of the alignment of the lateral indentations in the front and rear portions of the inverted U-shaped mount, than is shown in FIG. 4.
Figure 6:
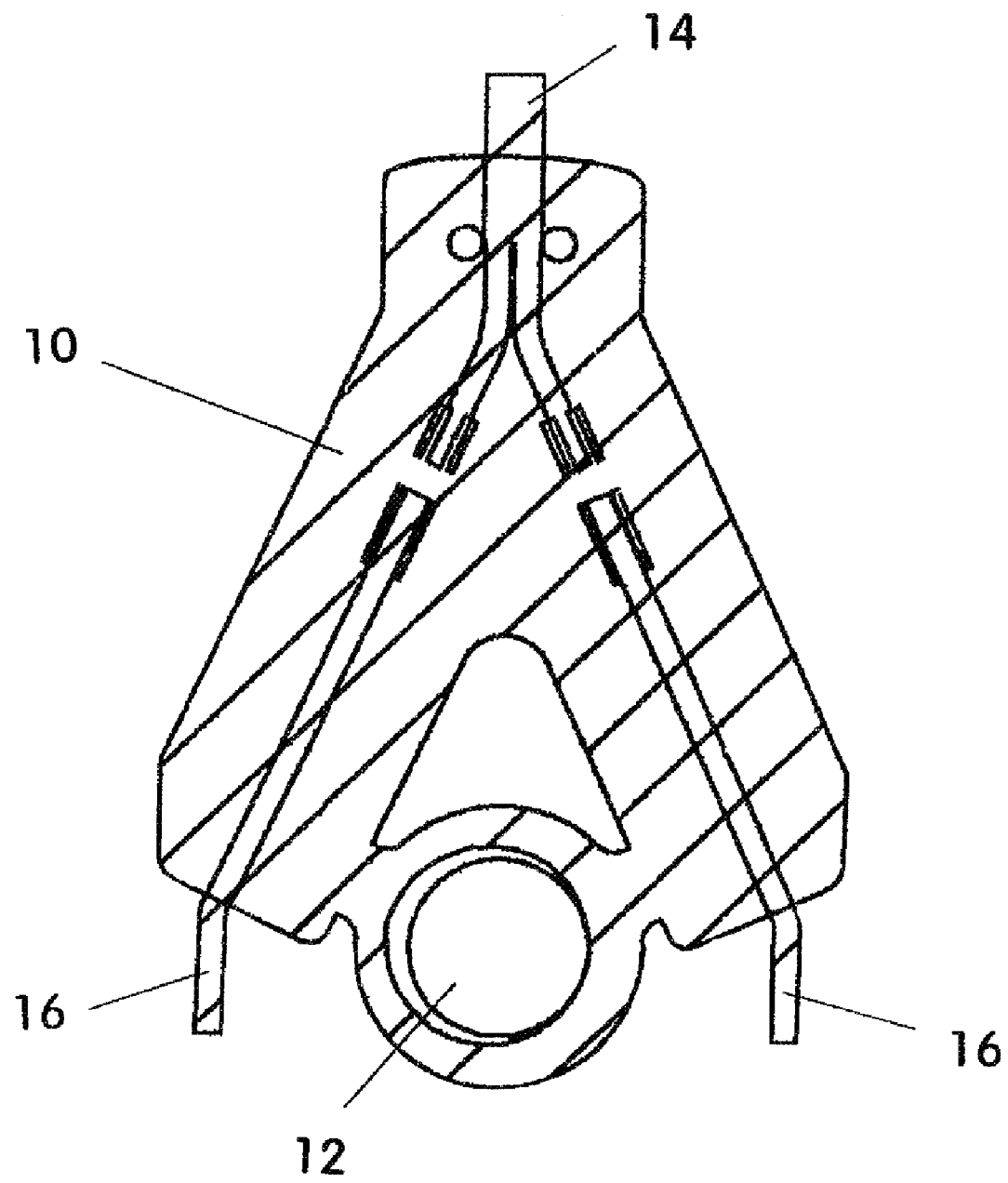
FIG. 6 is a sectional view of the wiring, two electrically-conductive rods, and the over-molding used in the first preferred embodiment 2 of the present invention to secure the wiring and electrically-conductive rods to the inverted U-shaped mount.
Figure 7:
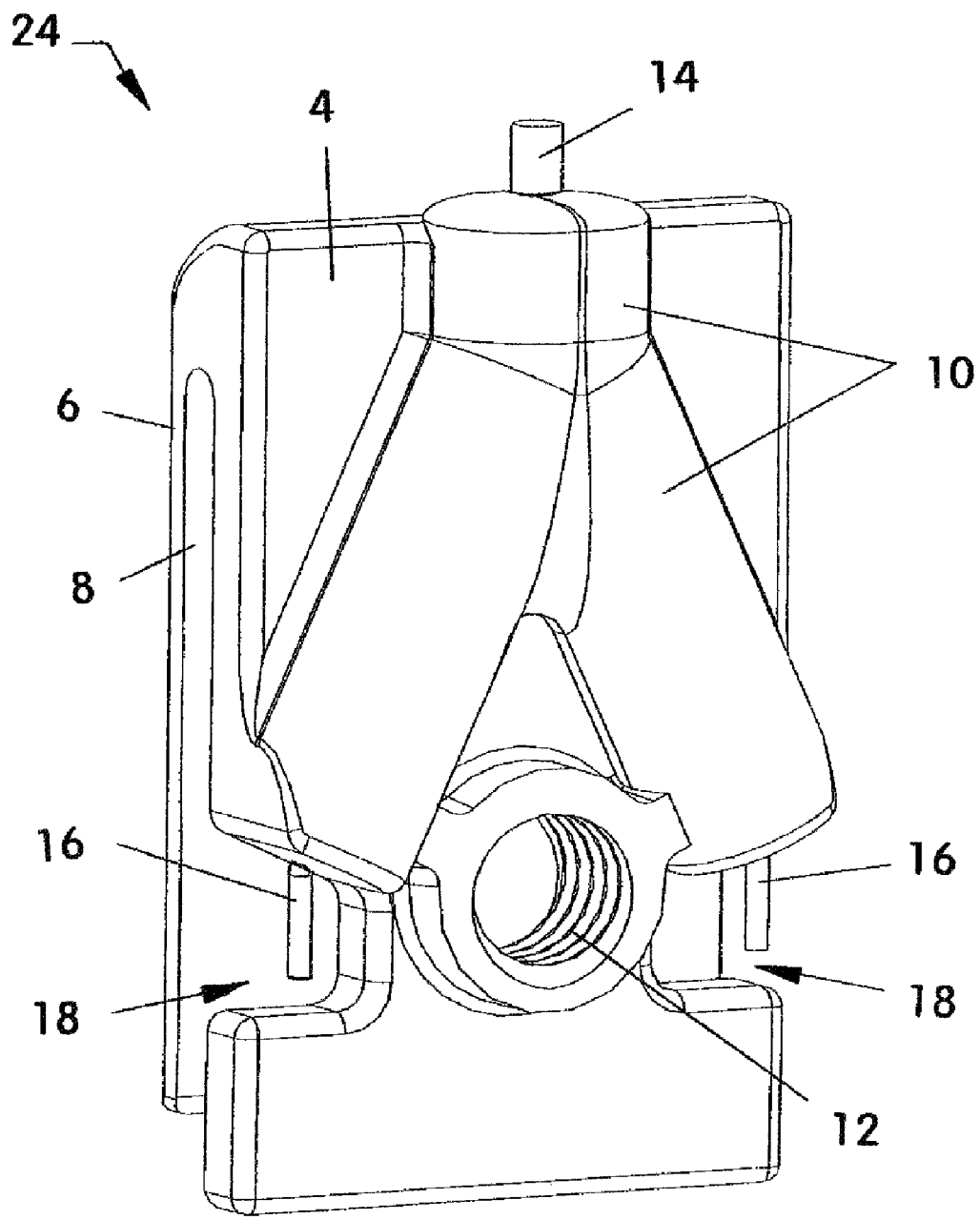
FIG. 7 is a front view of a second preferred embodiment 24 of the present invention which has no lateral cutout areas in the rear portion of its inverted U-shaped mount.
Figure 8:
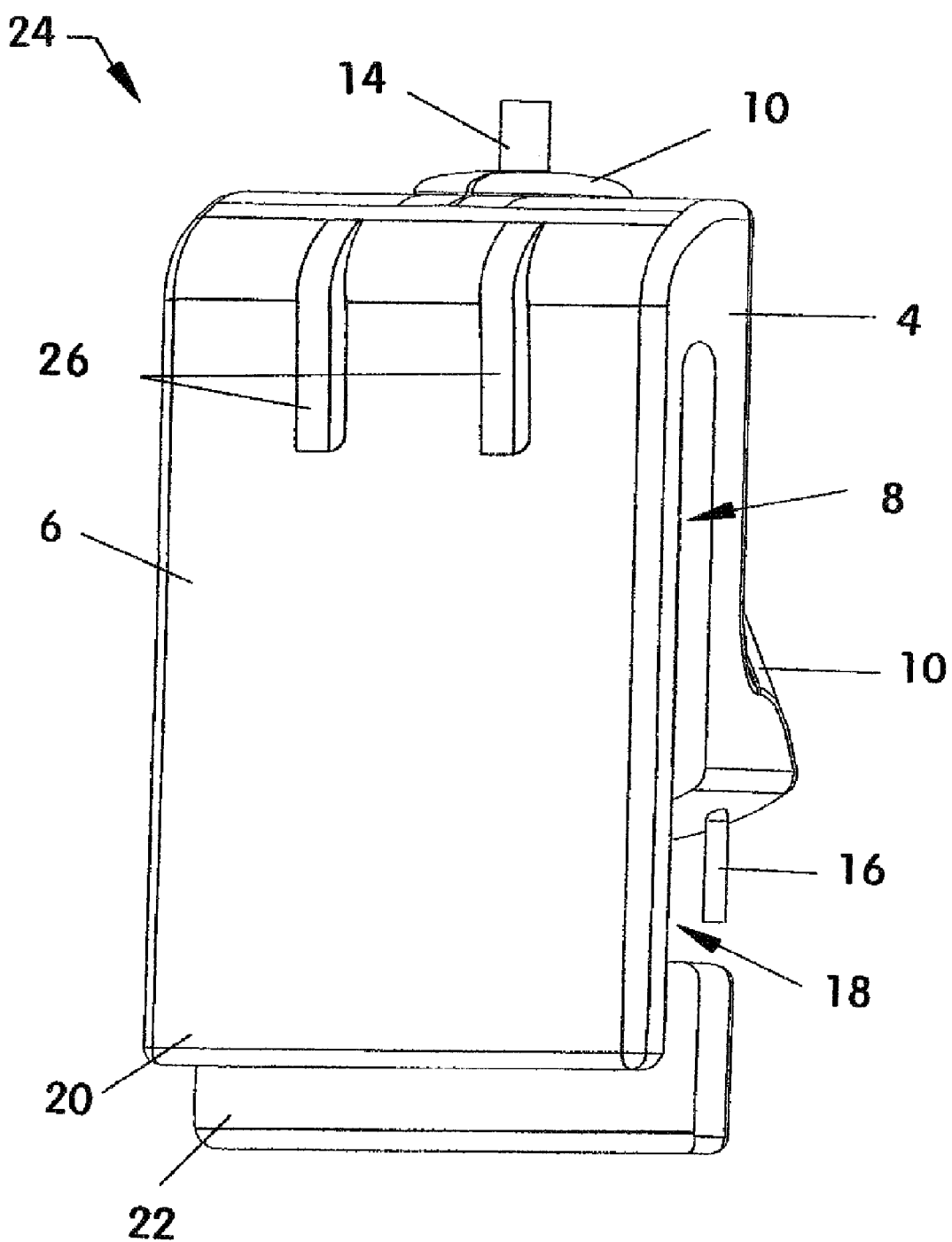
FIG. 8 is a rear view of the second preferred embodiment 24 of the present invention shown in FIG. 7.

The present invention is a device providing rapid means for testing the proper operation of the sensing probe (not shown) of a fluid-sensing switch system that monitors the fluid level in the primary drain pan located inside an air conditioning unit (not shown) or other condensate-producing unit, without removal of the sensing probe from its established position within the condensate-producing unit. Thus, instead of having to remove the threaded plug of a sensing probe from the condensate-producing unit's weep hole to test the sensing probe for proper function, installers and maintenance personnel can simply press a different finger against each of two electrically-conductive rods 16 attached to the present invention's inverted U-shaped mount via over-molding 10, while the inverted U-shaped mount is fixed to the upper perimeter edge of a secondary drain pan (not shown) positioned underneath at least a portion of the condensate-producing unit, wherein if proper functioning of the sensing probe occurs, a circuit will be completed via the finger contact with two electrically-conductive rods and the condensate-producing unit will be shut off and/or a pump will be activated to assist in the removal of collected condensate from the secondary drain pan. No moving parts are required for present invention testing, and no switch must be manually engaged by the tester. Electrically-conductive wiring 14 in electrical communication with the two electrically-conductive rods 16 is used to connect electrically-conductive rods 16 to a sensing probe monitoring fluid levels in a primary drain pan located inside a condensate-producing unit. The voltage carried by electrically-conductive wiring 14 is small so as not to shock the tester's finger when they come into contact with electrically-conductive rods 16. In reviewing the accompanying figures it must be understood that they have been drawn for simplicity and clarity. Thus, different preferred embodiments of the present invention may vary in surface texture and design. Also, in some of the illustrations only those components pertinent to understanding that embodiment of the present invention may be shown and/or numbered. Furthermore, to assist in understanding the principles and advantages of the present invention, identical numbering has been given to identical or functionally similar elements throughout the separate figures. Thus, the following description of the two most preferred embodiments of the present invention is merely exemplary in nature and is not intended to limit the invention's structure, function, or application. FIGS. 1-5 illustrate a first preferred embodiment 2 of the present invention, while FIGS. 7-8 illustrate a second preferred embodiment 24 of the present invention. FIG. 6 illustrates the electrically-conductive wiring 14, two opposed electrically-conductive rods 16, and over-molding 10 used in both illustrated preferred embodiments (2 and 24).

Figure 1:
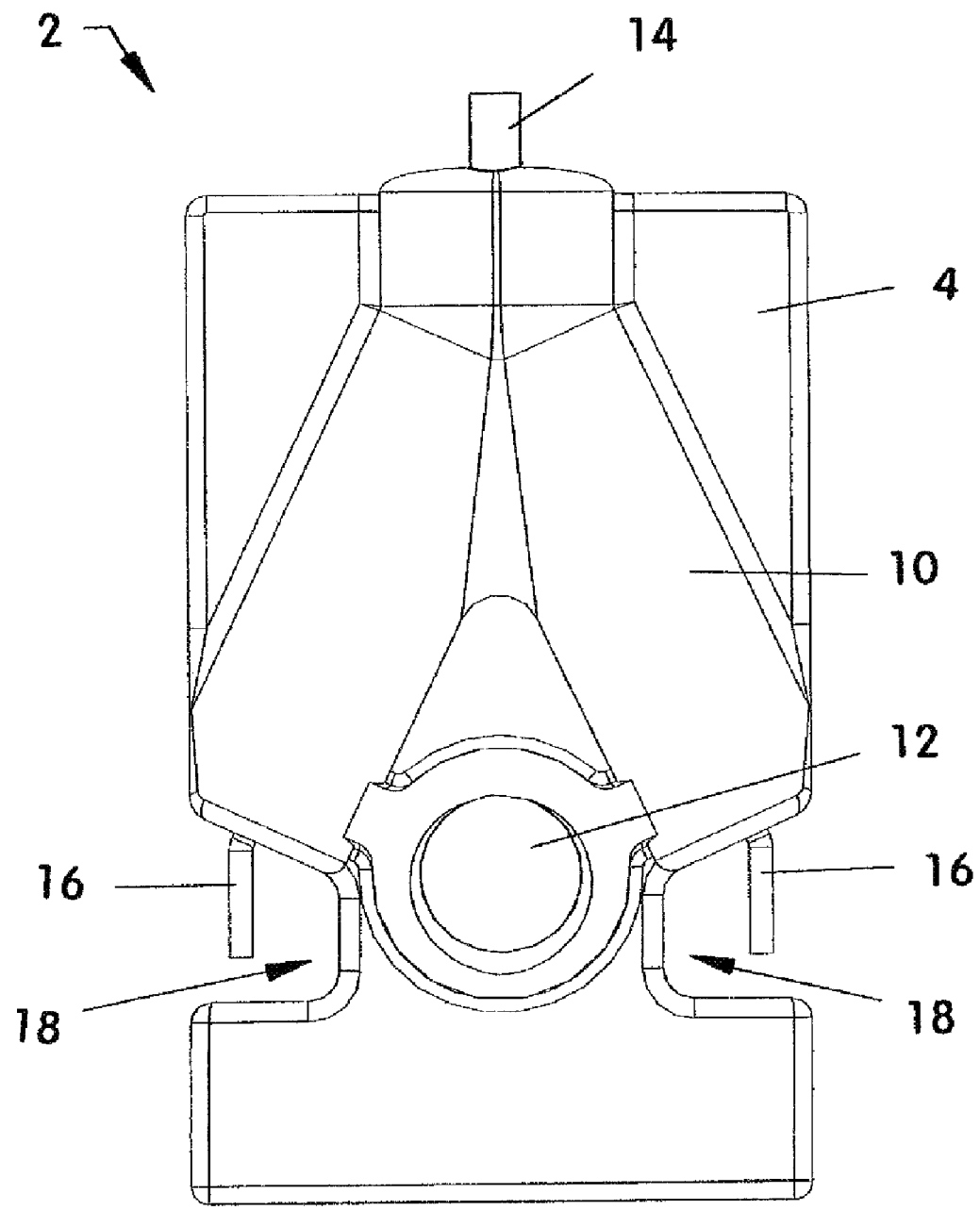
FIG. 1 is a front view of a first preferred embodiment of the present invention having wiring connected to two electrically-conductive rods that are over-molded onto an inverted U-shaped mount which can be secured via its laterally-centered threaded opening to the top edge of a secondary drain pan under a condensate-producing unit.

FIGS. 1-5 illustrate a first preferred embodiment 2 of the present invention, while FIG. 6 illustrates the electrically-conductive wiring 14, electrically-conductive rods 16, and over-molding 10 used therein. FIG. 1 is a front view of a first preferred embodiment 2 of the present invention having electrically-conductive wiring 14 connected to two electrically-conductive rods 16 that are all secured via over-molding to an inverted U-shaped mount made from front portion 4, rear portion 6, and inverted slot 8, which can be secured via its laterally-centered threaded opening 12 to the top edge of a secondary drain pan (not shown) under a condensate-producing unit (not shown). The electrically-conductive wiring 14 is used to place the electrically connective rods 16 in electrical communication with a sensing probe located within a condensate-producing unit to monitor the fluid level of the unit's primary drain pan. Although one threaded opening 12 is shown in FIG. 1, it is considered to be within the scope of the present invention for more than one threaded opening 12 to be present. FIG. 1 also shows both electrically-conductive rods 16 extending approximately three-fourths of the distance longitudinally through its protective lateral indentation 18, and less that one-half of the distance into each protective lateral indentation 18. However, although the positioning shown for electrically-conductive rods 16 in FIG. 1 it preferred, it should not be considered as limiting. Also, the perimeter configurations of the opposed lateral indentations in the front and rear portions of the inverted U-shaped mount may be different from that shown in FIG. 1, perhaps being more elliptical, but not limited thereto. Furthermore, although the most preferred perimeter configuration of the inverted U-shaped mount of the present invention is shown in FIG. 1, it too may vary from that shown in FIG. 1. However, it is not typically expected for the width of inverted U-shaped mount to exceed two inches, so that electrically-conductive rods 16 can be easily contacted by the opposing thumb and index finger on the same hand of a tester. Also, the preferred length dimension of inverted U-shaped mount is not typically expected to exceed two or two-and-one-half inches. Furthermore, in addition to its attachment function, the over-molding 10 shown in FIG. 1 typically provides a watertight seal around electrically-conductive wiring 14 and a portion of each electrically-conductive rod 16. However, the size and configuration of the over-molding 10 shown in FIG. 1 is merely representative, and many other visually-diverse configurations are also contemplated and considered to be within the scope of the present invention as long as they securely fix electrically-conductive wiring 14 and electrically-conductive rods 16 to the front portion 4 of the present invention inverted U-shaped mount. Furthermore, although the materials used for components of the present invention may vary, it is preferred that they be non-corroding and have a temperature rating at least up to 275-degrees Fahrenheit for use in hot attics. Also, although not limited thereto, the preferred material for electrically-conductive rods 16 is stainless steel. In addition, although not shown, should a condensate-producing application occur where no secondary drain pan is associated with a condensate-producing unit, double-sided tape could be used to secure the inverted U-shaped mount of the present invention in an accessible location for testing use.

Figure 2:
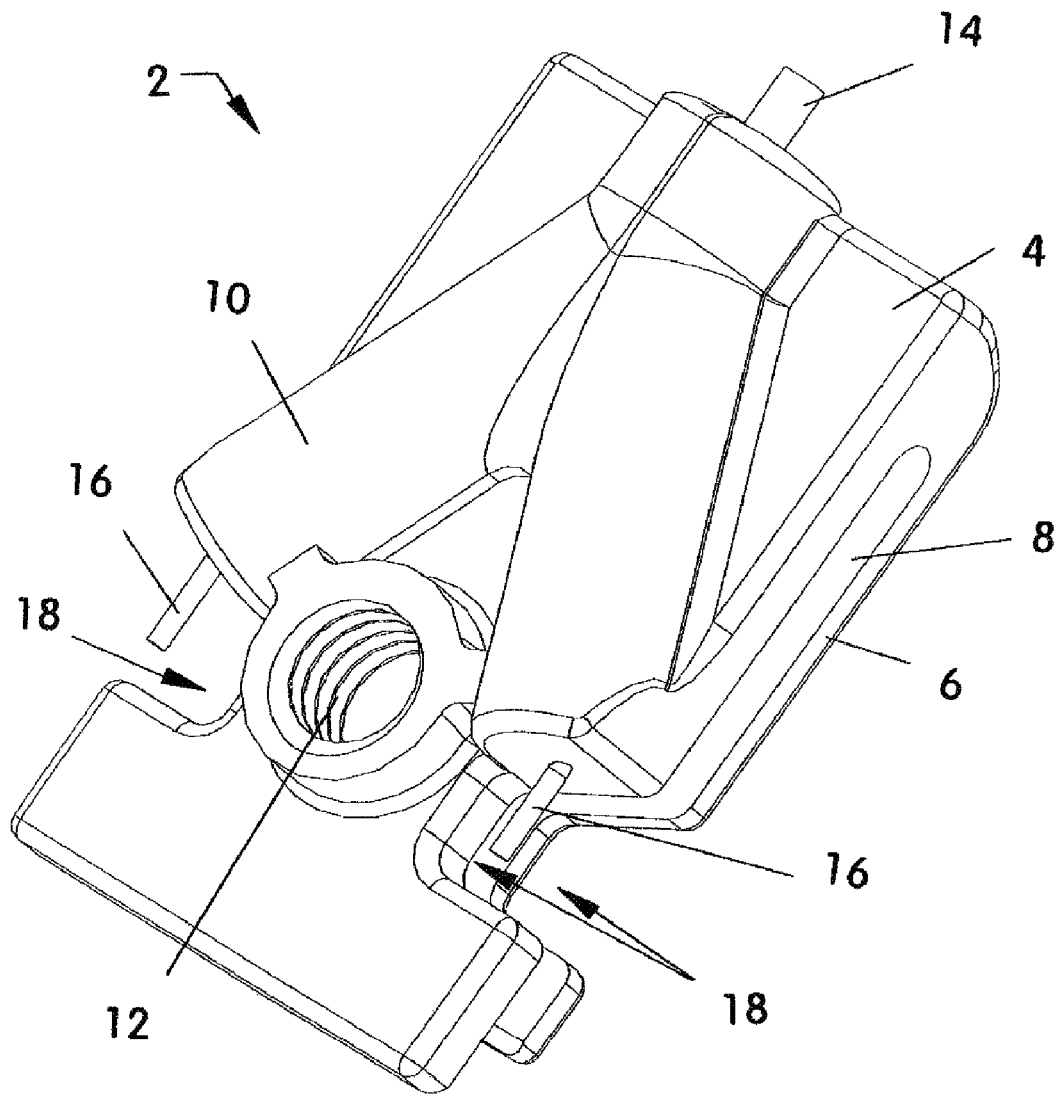
FIG. 2 is a perspective view of the first preferred embodiment 2 of the present invention showing an upwardly-directed slot through most of its inverted U-shaped mount.
Figure 3:
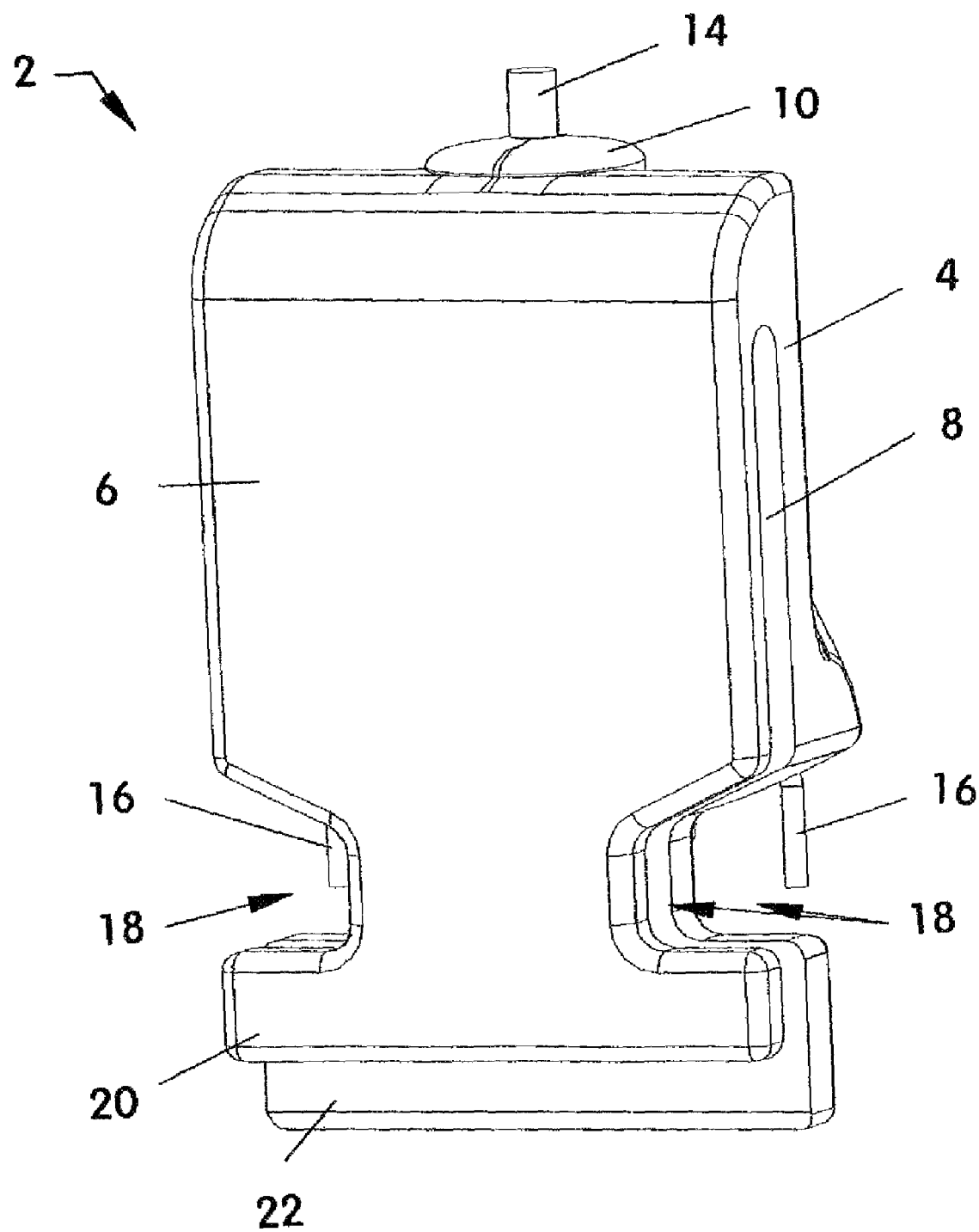
FIG. 3 is a rear view of the first preferred embodiment 2 of the present invention showing the slot in its inverted U-shaped mount, two opposed lateral indentation in the front portion of the inverted U-shaped mount, two opposed lateral indentation in the rear portion of the inverted U-shaped mount, the front and rear lateral indentations on each side of the inverted U-shaped mount aligned with one another and together providing easy finger testing access for a different one of the laterally positioned electrically-conductive rods.

In contrast to FIG. 1, FIG. 2 is a perspective view of the first preferred embodiment 2 of the present invention showing the upwardly-directed slot in the inverted U-shaped mount between front portion 4 and rear portion 6. An example of a preferred thickness dimension for over-molding 10 is also revealed in FIG. 2, but should not be considered as limiting. FIG. also shows the rear portion of inverted U-shaped mount having opposed lateral indentations 18, which assist in easy finger access to electrically-conductive rods 16. However, as shown in FIGS. 7 and 8, the opposed lateral indentations 18 in the rear portion of inverted U-shaped mount are not required. Furthermore, the upper edge of the threaded opening 12 centrally under over-molding 10 in FIG. 2 may be visually different from that shown, and does not need to have the same strengthening configuration of projections (un-numbered) extending outwardly therefrom toward ever-molding 10. In addition, in FIG. 2 one can see that in the first preferred embodiment 2 of the present invention the front portion 4 of its inverted U-shaped mount has a slightly longer length dimension than its rear portion 6. The relative lengths of front portion 4 and rear portion 6 are not critical should be guided by derived benefit in an application and the material cost required to achieve it as long as at a minimum the length dimensions of front portion 4 and rear portion 6 are the same. If the length of front portion 4 is extended beyond that of rear portion 6, it enables an installer to push the inverted U-shaped mount completely to the bottom of a secondary drain pan while it is supported by the top of a secondary drain pan wall. Thus, front portion 4 bottoms out inside the secondary drain pan before the rear portion 6 of the inverted U-shaped mount would come into contact with any baseboard structure or other floor molding positioned close to the pan. Furthermore, although the length of electrical wiring 14 is very short, its length is merely representative, and it should be understood that the length of electrical wiring 14 will be as long as needed to provide the needed electrical communication with the sensing probe to be periodically tested by the present invention, and include a quick-disconnect (not shown), if needed. FIG. 3 is a rear view of the first preferred embodiment 2 of the present invention showing the slot 8 in its inverted U-shaped mount, two lateral indentations 18 in the front portion of the inverted U-shaped mount, two lateral indentations in the back portion of the inverted U-shaped mount, the front and back indentations 18 on each side of the inverted U-shaped mount aligned and with one another and together providing easy finger touch testing access to a different one of the laterally positioned electrically-conductive rods 16 while concurrently protecting electrically-conductive rods 16 from inadvertent contact with other objects during installation and/or maintenance of the condensate-producing unit and its fluid-level monitoring system. FIG. 3 also shows the bottom end 22 of the front portion 4 of the inverted U-shaped mount extending below the bottom end 20 of the rear portion 4 of the inverted U-shaped mount. FIG. 4 is a side view of the first preferred embodiment 2 of the present invention providing a clear view into the upwardly-directed slot 8 between the front portion 4 of the inverted U-shaped mount and its rear portion 6. FIG. 4 also shows the near electrically-conductive rod 16 aligned with the laterals indentations of both front portion 4 and rear portion 6. FIG. 4 does not reveal any ribs or other grip-enhancing structure within upwardly-directed slot 8, as the orientation of the inverted U-shaped mount of the present invention relative to its support surface is not critical to its proper function. FIG. 5 is a perspective view of the first preferred embodiment 2 of the present invention providing a better view of the aligned lateral indentations 18 in the front and rear portions of the inverted U-shaped mount, than is shown in FIG. 4. FIG. 5 also shows the open interior end of the threaded opening 12 that communicates with slot 8 and allows a threaded fastener (not shown) to secure the front portion 4 of the inverted U-shaped mount against the interior wall of a secondary drain pan located under a condensate-producing unit. Although not shown, informational markings may be added in many locations to the front and rear portions (4, 6) of inverted U-shaped mount, as well as to over-molding 10.

FIG. 6 is a sectional view of the electrically-conductive wiring 14, two electrically-conductive rods 16, and the over-molding 10 used in the first preferred embodiment 2 of the present invention to secure the electrically-conductive wiring 14 and the electrically-conductive rods 16 against the front portion 4 of the inverted U-shaped mount. As can be seen in FIG. 6, as well as in FIGS. 1-5, the upper portions of the inverted U-shaped mount of the present invention is purposefully designed to be rounded and not likely to collect/trap any condensate that comes into contact with it. Also, the downwardly-angled configuration of over-molding 10 diverts condensate coming into contact with it toward the sides of the inverted U-shaped mount, making it unlikely to contact the electrically-conductive rods 16 that are each protected within a separate lateral indentation 18. Although not shown, a finger-tightened fastener used to secure the inverted U-shaped mount in place over the top edge of a secondary drain pan wall can be connected through the threaded opening 12 in or adjacent to over-molding 10. Due to the close fit of many secondary drain pans in an installation site, and although not shown, it is preferred for the finger-tightened fastener to be inserted through the front portion 4 of the inverted U-shaped mount and engage the interior surface of one of the secondary drain pan walls. Furthermore, and also not shown, to provide additional convenience during installation and maintenance activity of a condensate-producing unit, a fluid-level monitoring system, and a secondary drain pan, an optional quick disconnect may be employed between the sensing probe for which testing via the present invention device is needed and the electrically-conductive wiring 14 secured to the inverted U-shaped configuration via over-molding 10.

FIGS. 7-8 illustrate a second preferred embodiment 24 of the present invention wherein only the front portion 4 of the inverted U-shaped mount has opposed lateral indentations. Other features of the second preferred embodiment 24 appear similar to those shown in FIG. 1 for the first preferred embodiment 2 of the present invention, and have most of the same similarities and potential for variation. FIG. 7 is a front view of a second preferred embodiment 24 of the present invention which has no opposed lateral indentations in the rear portion 6 of its inverted U-shaped mount. FIG. 8 is a rear view of the second preferred embodiment 24 of the present invention shown in FIG. 7, with rear portion 6 having uninterrupted side edges. FIG. 8 shows the bottom end 22 of the front portion 4 of the inverted U-shaped mount extending below the bottom end 20 of the rear portion 4 of the inverted U-shaped mount. However, as for the first preferred embodiment 2 of the present invention, in the second preferred embodiment 24 of the present invention a front portion 4 with a length dimension greater than that for the rear portion 6 of inverted U-shaped mount is not critical, and the length dimensions of the front portion 4 and the rear portion 6 may also be the same. The extended length in the front portion 4 enables an installer to push the inverted U-shaped mount completely to the bottom of a secondary drain pan while it is supported by the top of a secondary drain pan wall. Thus, front portion 4 bottoms out inside the secondary drain pan before the rear portion 6 of the inverted U-shaped mount would come into contact with any baseboard structure or other floor molding. Furthermore, as shown in FIG. 8, optional strengthening ribs 26 or can be added to the upper rear surface of rear portion 6 if the benefit derived in a specific application justifies the material cost increase.

Thus, it can be seen that present invention provides a means for rapid remote testing a sensing probe that is located inside an air conditioning unit or other condensate-producing unit (not shown) and monitors the fluid level in the primary drain pan (not shown) within the condensate-producing unit, without a need for the sensing probe to be removed from its established position of use while testing takes place. It can be easily installed over the top edge of a secondary drain pan, and does not require undue installation effort for accurate orientation to ensure its proper and reliable function. While at least two preferred embodiments has been presented herein, it should be appreciated that a vast number of variations also exist. It should also be appreciated that the exemplary embodiments disclosed herein are only examples, and are not intended to limit the scope, applicability, or configuration of the invention in any way. Instead, the scope of the present inventions should be determined by the appended claims.

What is claimed is:

1. A finger touch testing device electrically connectible to a sensing probe used to monitor the fluid level of the primary drain pan inside a condensate-producing unit, said testing device comprising:
    a mount having an inverted U-shaped configuration with a front portion, a rear portion, and a slot vertically extending between said front portion and said a rear portion;
    two lateral indentations in said front portion of said inverted U-shaped mount, said lateral indentations in positions substantially opposed to one another;
    two electrically-conductive rods each fixed to said inverted U-shaped mount, with a portion of each said electrically-conductive rod extending into a different one of said lateral indentations; and
    electrically-conductive wiring fixed to said inverted U-shaped mount and having electrical communication with said two electrically-conductive rods so that when said electrically-conductive wiring is connected to a sensing probe installed inside a condensate-producing unit to monitor the fluid level in its primary drain pan, and further when a person places two different fingers against said inverted U-shaped mount so that a portion of each finger enters a different one of said lateral indentations and touches one of said electrically-conductive rods extending into it, proper operation of the fluid level sensor connected to said finger touch testing device will become immediately evident to that person by the occurrence of shut-off or activation action otherwise expected as a result of proper sensing probe function.

2. The testing device of claim 1 further comprising at least one threaded opening through said inverted U-shaped mount and configured for use with a fastener having complementary threads.

3. The testing device of claim 2 wherein said at least one threaded opening extends through said front portion of said inverted U-shaped mount so as to enable said inverted U-shaped mount to be secured to a secondary drain pan from inside the pan.

4. The testing device of claim 1 wherein said two electrically-conductive rods and said electrically-conductive wiring are fixed to said inverted U-shaped mount via over-molding.

5. The testing device of claim 4 wherein said over-molding is downwardly-angled and configured to laterally direct fluid thereon outwardly beyond said electrically-conductive rods situated within said opposed lateral indentations so that such fluid is unlikely to come into contact with said electrically-conductive rods.

6. The testing device of claim 1 wherein said rear portion of said inverted U-shaped mount also has two opposed lateral indentations, with said two opposed lateral indentations of said front portion each being aligned with a different one of said two opposed lateral indentations in said rear portion.

7. The testing device of claim 1 wherein said front portion of said inverted U-shaped mount has a greater length dimension than that of said rear portion of said inverted U-shaped mount.

8. The testing device of claim 1 wherein said rear portion of said inverted U-shaped mount has at least one strengthening rib.

9. The testing device of claim 1 wherein said inverted U-shaped mount is configured without fluid-collecting surfaces and structure.

10. The testing device of claim 1 wherein said two electrically-conductive rods and said electrically-conductive wiring are fixed to said inverted U-shaped mount via over-molding and further wherein said inverted U-shaped mount and said over-molding are configured without fluid-collecting surfaces and structure.

11. The testing device of claim 1 wherein said two electrically-conductive rods and said electrically-conductive wiring are fixed to said inverted U-shaped mount via over-molding, wherein said over-molding has a downwardly angled configuration, and further wherein said inverted U-shaped mount and said over-molding are configured without fluid-collecting surfaces and structure.

\* \* \* \* \*